United States Patent
Yang et al.

(10) Patent No.: US 8,218,817 B2
(45) Date of Patent: Jul. 10, 2012

(54) ONLINE ARTICULATE OBJECT TRACKING WITH APPEARANCE AND SHAPE

(75) Inventors: Ming-Hsuan Yang, Santa Clara, CA (US); Jeffrey Ho, Gainesville, FL (US)

(73) Assignees: Honda Motor Co. Ltd., Tokyo (JP); University of Florida Research Foundation, Inc., Gainesville, FL (US)

( * ) Notice: Subject to any disclaimer, the term of this patent is extended or adjusted under 35 U.S.C. 154(b) by 853 days.

(21) Appl. No.: 12/339,029

(22) Filed: Dec. 18, 2008

(65) Prior Publication Data

US 2009/0226037 A1 Sep. 10, 2009

Related U.S. Application Data

(60) Provisional application No. 61/016,309, filed on Dec. 21, 2007.

(51) Int. Cl.
G06K 9/00 (2006.01)
(52) U.S. Cl. .................................. 382/103; 348/169
(58) Field of Classification Search .................. 382/100, 382/103, 106, 107, 181, 190, 195, 199, 203, 382/206; 707/758–780; 715/863; 348/135, 348/143, 169–172
See application file for complete search history.

(56) References Cited

U.S. PATENT DOCUMENTS

| | | | | |
|---|---|---|---|---|
| 7,352,881 B2 * | 4/2008 | Lestideau | ..................... | 382/103 |
| 7,634,143 B2 * | 12/2009 | Saito | ............................. | 382/225 |
| 7,864,990 B2 * | 1/2011 | Corcoran et al. | ............. | 382/118 |
| 7,916,897 B2 * | 3/2011 | Corcoran et al. | ............. | 382/103 |
| 2006/0268111 A1 | 11/2006 | Zhang et al. | | |
| 2007/0070201 A1 | 3/2007 | Yokomitsu et al. | | |
| 2007/0127774 A1 * | 6/2007 | Zhang et al. | ................... | 382/103 |
| 2007/0297645 A1 * | 12/2007 | Pace | .............................. | 382/103 |
| 2008/0037839 A1 * | 2/2008 | Corcoran et al. | ............. | 382/118 |

OTHER PUBLICATIONS

Adam, A., et al., "Robust Fragments-Based Tracking Using Integral Histogram" In Proc. IEEE Conf. on Comp. Vision and Patt. Recog., pp. 2142-2147, 2006.
Birchard, S., "Elliptical Head Tracking Using Intensity Gradients and Color Histograms," In Proc. IEEE Conf. on Comp. Vision and Patt. Recog., pp. 232-237, Jun. 1998.
Boykov, Y., et al., "Interactive Graph Cuts for Optimal Boundary and Region Segmentation of Objects in n-d images," In Proc. Int. Conf. on Computer Vision, vol. 1, pp. 105-112, Jul. 2001.
Comaniciu, V., et al., "Real-time Tracking of Non-Rigid Objects Using Mean Shift," In Proc. IEEE Conf. on Comp. Vision and Patt. Recog., pp. 2142-2147, 2000.
Fan, Z., et al., "Efficient Optimal Kernel Placement for Reliable Visual Tracking, " In Proc. IEEE Conf. on Comp. Vision and Patt. Recog., 8 pages, 2007.

(Continued)

*Primary Examiner* — Anand Bhatnagar
(74) *Attorney, Agent, or Firm* — Fenwick & West LLP; Mark Duell (57) ABSTRACT

A visual tracker tracks an object in a sequence of input images. A tracking module detects a location of the object based on a set of weighted blocks representing the object's shape. The tracking module then refines a segmentation of the object from the background image at the detected location. Based on the refined segmentation, the set of weighted blocks are updated. By adaptively encoding appearance and shape into the block configuration, the present invention is able to efficiently and accurately track an object even in the presence of rapid motion that causes large variations in appearance and shape of the object.

21 Claims, 6 Drawing Sheets

OTHER PUBLICATIONS

Freedman, D., et al., "Active Contours For Tracking Distributions and Shape Prior," In Proc. Int. Conf. on Computer Vision, pp. 755-762, 2005.

Parameswaran, V., et al., "Tunable Kernels for Tracking," In Proc. IEEE Conf. on Comp. Vision and Patt. Recog vol. 2, pp. 2179-2186, 2006.

Porkli, F., "Integral Histogram: A Fast Way to Extract Histograms in Cartesian Spaces," In Proc. IEEE Conf. on Comp. Vision and Patt. Recog., vol. 1, pp. 829-836, 2005.

Viola, P., et al., "Rapid Object Detection Using a Boosted Cascade of Simple Features," In Proc. IEEE Conf. on Comp. Vision and Patt. Recog., vol. 1, pp. 511-518, 2001.

PCT International Search Report and Written Opinion, PCT/US08/87731, Feb. 6, 2009, 9 Pages.

Freedman, D., et al., "Active Contour for Tracking Distributions," IEEE Transactions on Image Processing, Apr. 2004, pp. 518-526, vol. 13, No. 4.

* cited by examiner

ONLINE ARTICULATE OBJECT TRACKING WITH APPEARANCE AND SHAPE

RELATED APPLICATIONS

This application claims priority from U.S. provisional application No. 61/016,309 entitled "Online Articulated Object Tracking with Appearance and Shape" filed on Dec. 21, 2007, the content of which is incorporated by reference herein in its entirety.

BACKGROUND

1. Field of Art

The invention generally relates to computer vision, and more specifically, to articulate object tracking.

2. Description of the Related Art

Developing an accurate, efficient and robust visual object tracker is a challenging problem in the field of computer vision. The task becomes even more difficult when the target object undergoes significant and rapid variation in shape as well as appearance. Such shape variation is common when tracking an articulated object (such as a human) due to the frequent and varied self-occlusions that may occur as the object moves.

One conventional approach to object tracking uses intensity histograms to represent the appearance of the object. Examples of such conventional approaches are described in S. Birchard. "*Elliptical Head Tracking Using Intensity Gradients and Color Histograms.*" In Proc. IEEE Conf. on Comp. Vision and Patt. Recog., pages 232-237, 1998; D. Comaniciu, V. Ramesh, and P. Meer. "*Real-time Tracking of Non-Rigid Objects Using Mean Shift.*" In Proc. IEEE Conf. on Comp. Vision and Patt. Recog., pages 2142-2147, 2000; P. Viola and M. Jones. "*Rapid Object Detection Using a Boosted Cascade of Simple Features.* In Proc. IEEE Conf on Comp. Vision and Patt. Recog., volume 1, pages 511-518, 2001; F. Porkli. "*Integral Histogram: A Fast Way to Extract Histograms in Cartesian Spaces.* In Proc. IEEE Conf. on Comp. Vision and Patt. Recog. Volume 1, pages 829-836, 2005; and A. Adam, E. Rivlin, and I. Shimshoni. "*Robust Fragments-Based Tracking Using Integral Histogram.*" In Proc. IEEE Conf. on Comp. Vision and Patt. Recog., pages 2142-2147, 2006, the contents of which are all incorporated by reference herein in their entirety.

These conventional approaches are typically applied to tracking objects having a regular shape (such as a rectangle). However, the conventional techniques are not sufficiently robust and efficient when applied to objects that have highly irregular shapes. Furthermore, such techniques do not work well when the object undergoes rapid and/or large motions that cause the shape to vary widely between image frames.

To handle shape variation in the context of histogram based tracking, one conventional approach is to use a (circular or elliptical) kernel to define a region around the target from which a weighted histogram can be computed. Instead of scanning the image, differential algorithms are used to iteratively converge to the target object. Examples of such approaches are described in Z. Fan, M. Yang, Y. Wu, and G. Hua. "*Efficient Optimal Kernel Placement for Reliable Visual Tracking.*" In Proc. IEEE Conf. on Comp. Vision and Patt. Recog. 2007; and V. Parameswaran, V. Ramesh, and I. Zoghlami. "*Tunable Kernels for Tracking.*" In Proc. IEEE Conf. on Comp. Vision and Patt. Recog. Volume 2, pages 2179-2186, 2006, the contents of which are incorporated by reference herein in their entirety.

The kernel used in the above approaches effectively reduces the more difficult problem of efficiently computing the intensity histogram from an irregular shape to that of a simpler one for estimating histogram from a regular shape. However, these differential approaches are still insufficient for tracking sequences with rapid and large motions, such as, for example, human motion.

Another conventional approach to tracking objects having irregular shapes is to enclose the target with a regular shape (e.g., a rectangular window) and compute the histogram from the enclosed region. However, such histograms inevitably include background pixels when the foreground shape cannot be closely approximated by the regular-shaped window. Consequently, the resulting histogram is corrupted by background pixels, and the tracking result degrades accordingly.

The histogram-based tracking methods are largely unsuccessful due to the lack of spatial information. For targets undergoing significant shape variations, the spatial component of the appearance is very prominent and the plain intensity histogram becomes visibly inadequate with unstable tracking results. While some approaches have attempted to incorporate spatial information into the histograms, these approaches require substantial increase of computation loads, thereby making these algorithms applicable to only local search and infeasible for global scans of images. Consequently, such algorithms are not able to track objects undergoing rapid motions.

In view of the present state of the art, there is a need for an object tracking system and method that efficiently and robustly tracks an articulated object in the presence of rapid motion and shape variation.

SUMMARY

A method, system, and computer program product tracks an object in a sequence of input images. A tracking module receives an image from the sequence of input images and detects a location of the object based on a set of weighted blocks representing the object's shape. The tracking module then refines a segmentation of the object from the background image at the detected location. Based on the refined segmentation, the set of weighted blocks are updated. This process then repeats for the next image frame using the updated set of weighted blocks.

In one embodiment, the weighted blocks represent both appearance and shape of the object based on foreground and background histograms of the weighted blocks. By adaptively encoding appearance and shape into the block configuration, the present invention is able to efficiently and accurately track an object even in the presence of rapid motion that causes large variations in appearance and shape of the object.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

System Architecture

A preferred embodiment of the present invention is now described with reference to the figures where like reference numbers indicate identical or functionally similar elements. Also in the figures, the left most digit of each reference number corresponds to the figure in which the reference number is first used.

Figure 1:
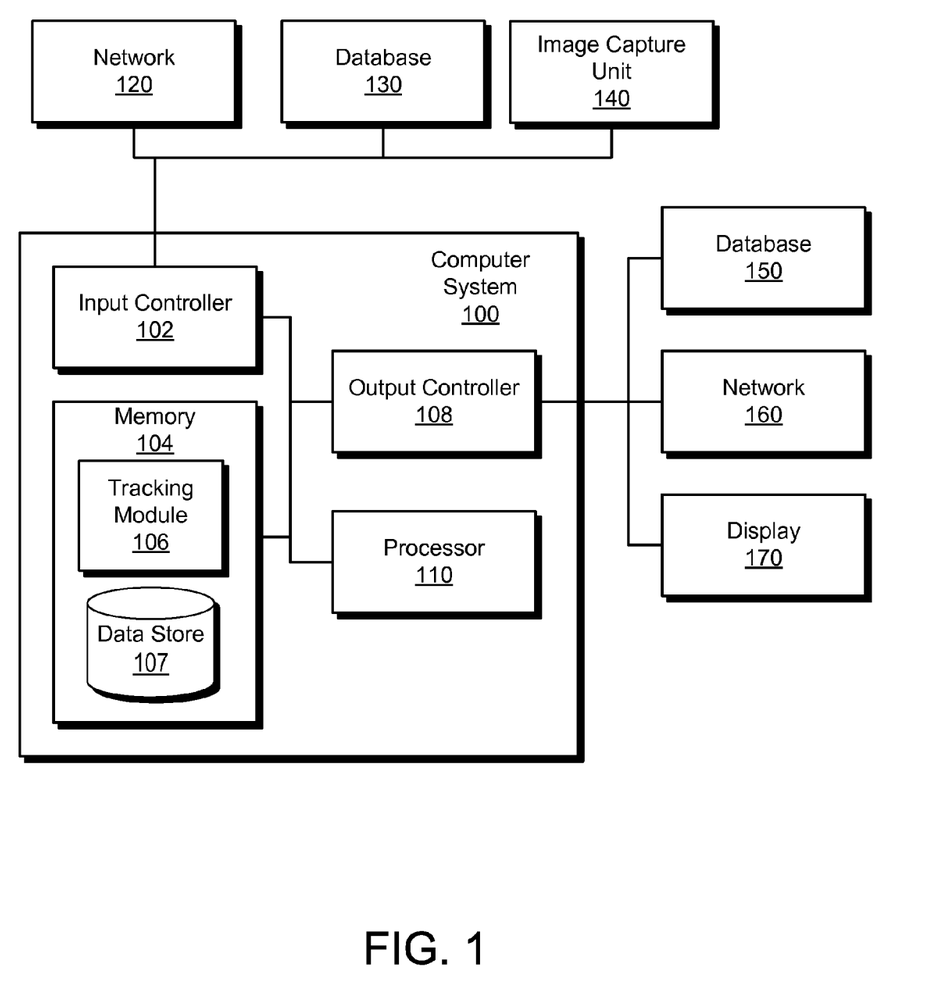
FIG. 1 is an example computer system in accordance with an embodiment of the present invention.

FIG. 1 is an illustration of a computer system 100 in which an embodiment of the present invention may operate. The computer system 100 includes a processor 110, an input controller 102, an output controller 108, and a memory 104.

The processor 110 processes data signals and may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included. The processor 110 may comprises an arithmetic logic unit, a microprocessor, a general purpose computer, or some other information appliance equipped to transmit, receive and process electronic data signals from the memory 104, the input controller 102, or the output controller 108.

The input controller 102 is any device configured to provide input (e.g., a video input) to the computer system 100. In one embodiment, the input controller 102 is configured to receive an input image sequence from one or more of a network 120, a database 130, and an image capture unit 140 (e.g., a video camera). The output controller 108 represents any device equipped to output processed data to one or more of a database 150, a network 160, and a display 170 (e.g., an organic light emitting diode display (OLED), a liquid crystal display (LCD), or a cathode ray tube (CRT) display).

The memory 104 stores data and/or instructions that may be executed by processor 110. The instructions may comprise code for performing any and/or all of the techniques described herein. Memory 104 may be a dynamic random access memory (DRAM) device, a static random access memory (SRAM) device, Flash RAM (non-volatile storage), combinations of the above, or some other memory device known in the art. The memory 104 comprises a data store 107 and a tracking module 106, and is adapted to communicate with the processor 110, the input controller 102, and/or the output controller 108. The tracking module 106 comprises computer executable instructions for carrying out the regression process described below.

It should be apparent to one skilled in the art that computer system 100 may include more or less components than those shown in FIG. 1 without departing from the scope of the present invention. For example, computer system 100 may include additional memory, such as, for example, a first or second level cache, or one or more application specific integrated circuits (ASICs). Similarly, computer system 100 may include additional input or output devices.

Figure 2:
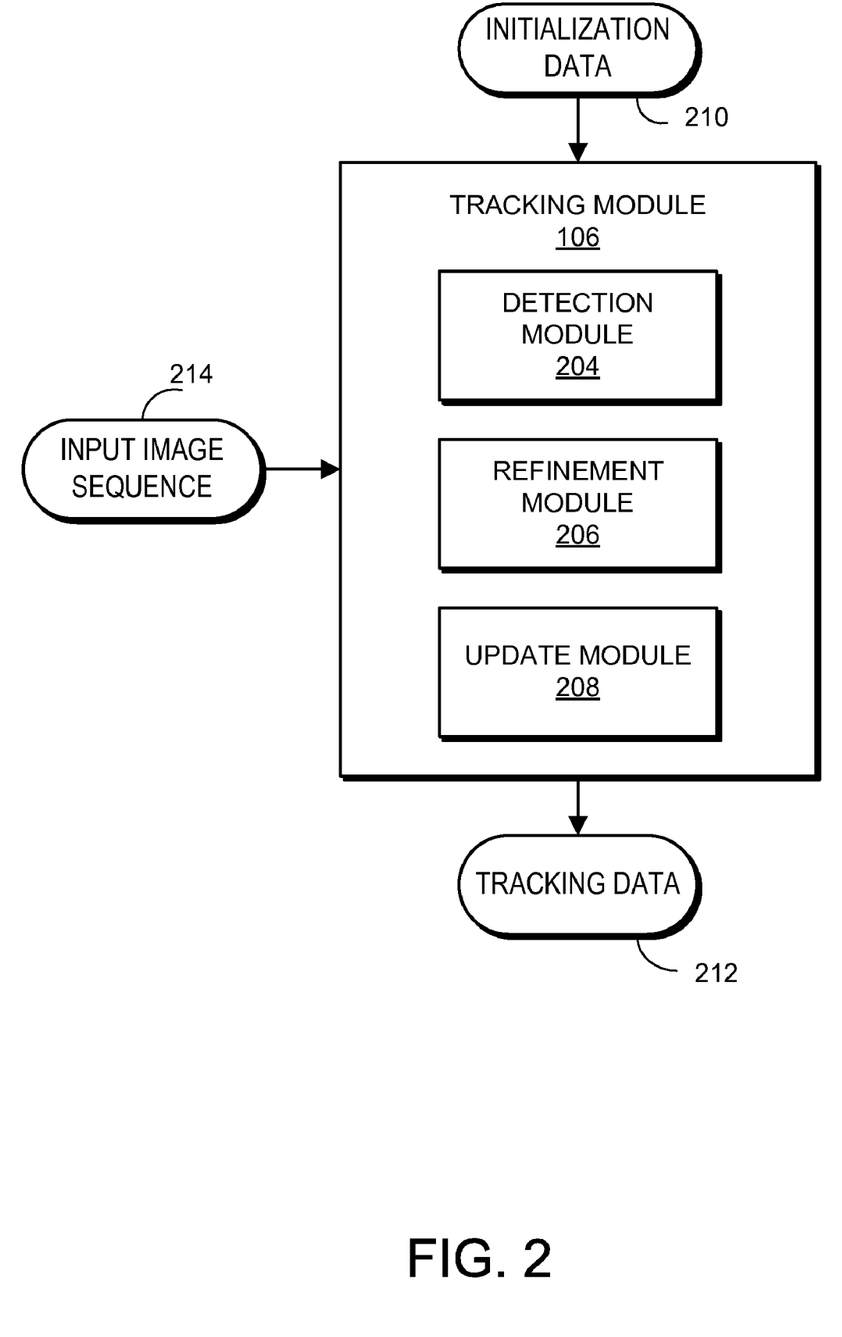
FIG. 2 is a block diagram illustrating a tracking module in accordance with an embodiment of the present invention.

FIG. 2 illustrates a more detailed view of the tracking module 106 in accordance with one embodiment of the present invention. The tracking module 106 receives an input image sequence 214. The input image sequence 214 may comprise a sequence of two-dimensional (2D) images from, for example, an external database 130, network 120, or image capture unit 140. The tracking module 106 also receives initialization data 210 related to the input image sequence 214. The initialization data 210 comprises an initial set of parameters used to initialize the tracking module 106. For example, the initialization data 210 may include an initial location and shape of the object to be tracked by the tracking module 106.

The tracking module 106 tracks an object in the input image sequence 214 and outputs tracking data 212. In one embodiment, the output tracking data 212 comprises a rectangular window W enclosing the target in each image frame. The tracking module 106 generates the tracking data 212 by exploiting an efficient appearance representation using histograms that can be easily evaluated and compared to locate the target object. Shape update, which typically requires more elaborated algorithms, is carried out by adjusting a few small blocks within the tracked window as will be described below.

At each frame t of the received image sequence 214, the tracking module 106 maintains a set of parameters used to compute the tracking data 212 for the current frame. First, the tracking module 106 maintains a template window $W_t$ representing the location of the object in the image frame. The tracking module 106 also maintains an approximate boundary contour representing the shape of the object in the image frame. This approximate boundary contour is represented by a set of K blocks $B_i$, $1 \leq i \leq K$, (e.g. 2-3 rectangular blocks) that that best overlap with the foreground object.

The blocks may have small overlaps with each other to account for extreme shape variations. While it is expected that the union of the blocks will cover most of the target, these blocks will nevertheless contain both foreground and background pixels. This happens often when the shape of the target exhibits strong concavity. To account for this, blocks contain large percentages of background pixels are down-weighted in importance when compared with blocks that contain mostly foreground pixels. Each block $B_i$ is assigned a weight $\lambda_i$ and blocks having a higher density of foreground pixels are given higher weights. In this framework, the shape information is represented by the block configuration and the associated weights. Furthermore, the spatial component of the object's appearance is also loosely encoded in the block structure. This technique permits flexibility in anticipating and handling shape variation as it does not heavily constrain the shape representation.

In addition to the block configuration, the tracking module 106 also maintains a foreground intensity histogram $H_t^f$ for the image frame t. The foreground histogram $H_t^f$ is represented by a collection of local foreground histograms $H_i^W$ (i.e. one local foreground histogram per block) and their associated weights $\lambda_i$. Finally, the tracking module 106 maintains a background histogram $H_t^b$ for the image frame. These quantities will be used in the tracking process described below.

In one embodiment, the tracking module 106 comprises a detection module 204, a refinement module 206 and an update module 208. As each frame of the image sequence 214 is sequentially received, the detection module 204 detects the object in the current image frame based on the tracking parameters maintained by the tracking module 106. A process for detecting an object is described in further detail below with respect to FIG. 4.

The refinement module 206 works within the detected window W to segment the target object from the background using the intensity histograms. As the tracking window W is typically very small, the target contour can be extracted by the refinement module 206 using a fast segmentation algorithm that does not increase the run time complexity significantly. A process for refining the shape contour is described in further detail below with respect to FIG. 5.

The update module 208 adaptively adjusts the positions of the blocks B within the tracking window W and their associated weights λ. The blocks are adjusted locally so that these blocks have maximum coverage of the foreground object as determined by the refinement module 206. In addition the update module 208 updates the background histogram $H_b$. This background histogram $H_b$ is used by the refinement module 206 to determine the target contour. A process for updating the block configuration is described in further detail below with respect to FIG. 6.

The tracking module 106 is able to track the object even under significant variations in shape. By using rectangular blocks to approximate the object shape, the tracking module 106 can perform rapid evaluation and comparison of histograms for efficient scanning of the entire images. This allows for efficient and accurate articulate object tracking under the general assumption that the foreground histogram stays roughly stationary. The tracking process executed by the tracking module 106 is described in further detail below with reference to FIGS. 3-6.

Tracking Process

Figure 3:
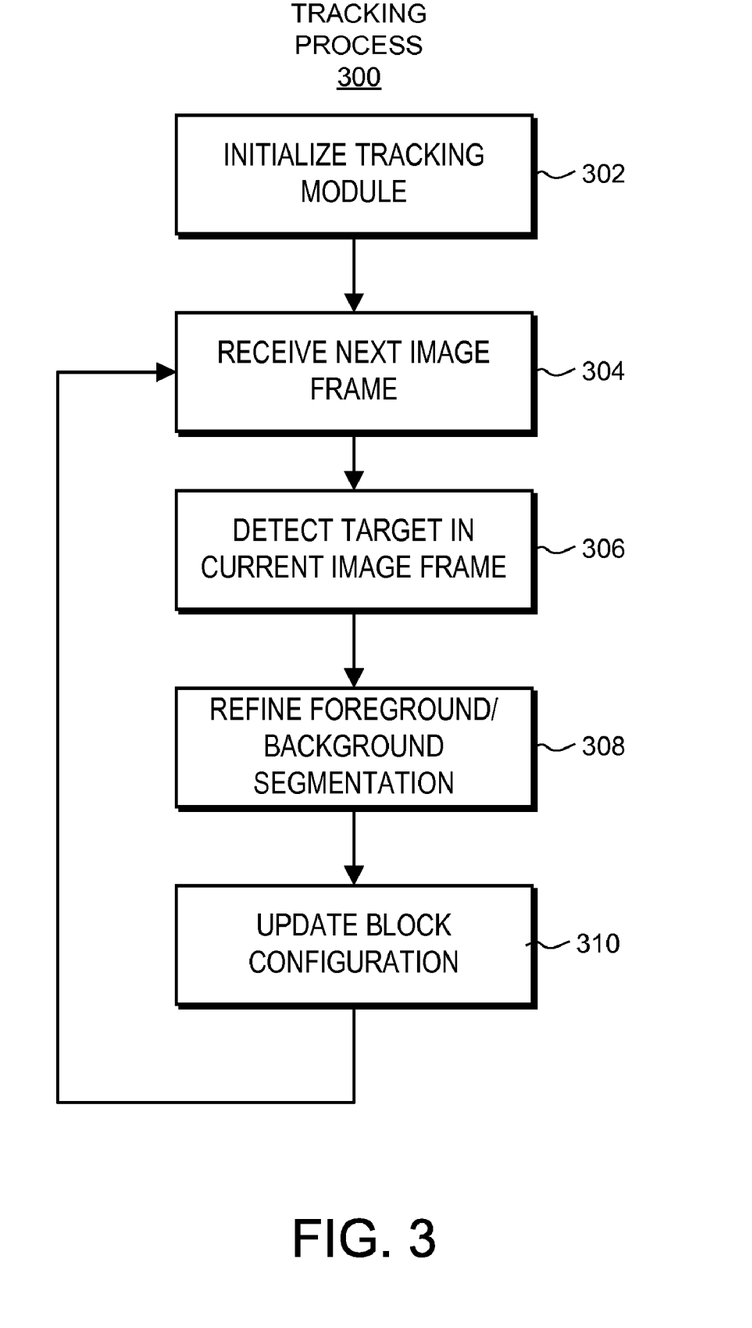
FIG. 3 is a flowchart illustrating a process for tracking an object in accordance with an embodiment of the present invention.

A high level outline of the tracking process 300 is illustrated in FIG. 3. When a new image sequence 214 is received, the tracking module 106 is first initialized 302 with the contour of the target object to be tracked. In one embodiment, initializing 302 the tracking module 106 comprises determining an initial template window W for the object (i.e. a rectangular box bounding the object). The shape of the foreground target is approximated by K rectangular blocks $B_i$ within the main template window W with weights $\lambda_i$. A foreground histogram $H_f$ for the initial frame is also computed and is maintained throughout the tracking process.

During tracking, an image frame is received 304 from the sequence of input images 214. The detection module 204 detects 306 the most likely location of the target object (i.e., the window within the current image frame that has the highest similarity with the template window W). The refinement module 206 then refines 308 the foreground/background segmentation based on the current foreground intensity histogram $H_i^f$. This refinement step 308 works exclusively within the detected window W detected by the detection module 204. The update module 208 uses the results from the foreground/background segmentation to update 310 the block configuration of the blocks in the detected window W. This update 310 may include both updating the block positions and recomputing the weights $\lambda_i$ assigned to each block $B_i$. In addition, the background density $H_b$ is also updated. The process then repeats using the newly detected window and the updated block configuration a template for the next received image frame.

In the process described below, the number of blocks K and the size of each block $B_i$ is fixed and the size of the blocks scales according to account for shape and appearance variation. However, in alternative embodiments, the number of blocks can also be dynamically updated as the shape and appearance of the object varies from frame to frame.

Detection Stage

Figure 4:
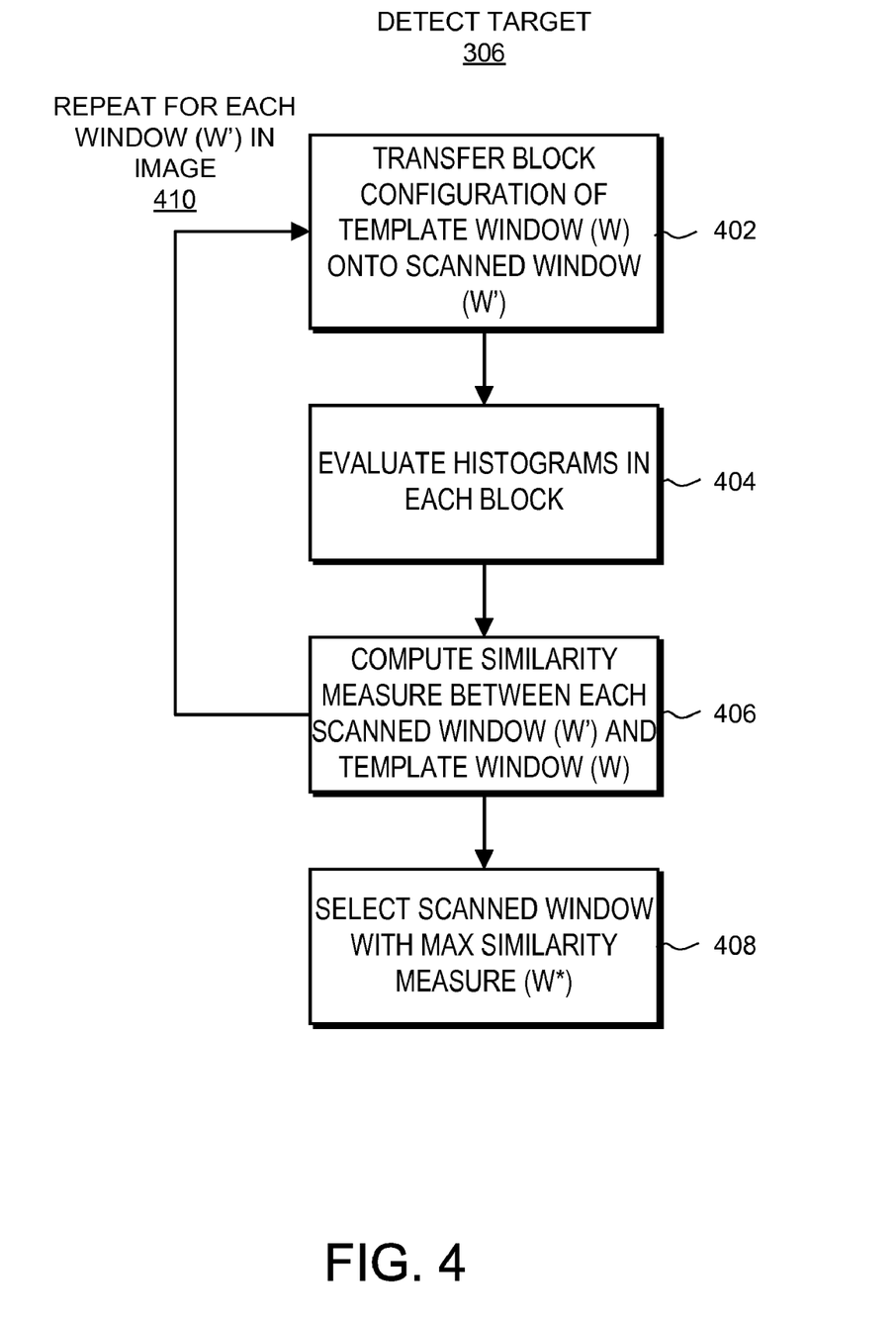
FIG. 4 is a flowchart illustrating a process for detecting an object for visual tracking in accordance with an embodiment of the present invention.

An embodiment of a process for detecting 306 the target object is now described in further detail below with reference to FIG. 4. The main feature used to detect the target is the intensity histogram. The detection module 204 detects the object as it moves between frames by comparing and matching the foreground intensity histogram of the previous object location to a foreground intensity histogram of a window in the current image frame. In one embodiment, integral histograms may be employed for efficient computation of the intensity histograms.

The detection module 204 scans each image frame as it is received to locate the target object. The prior location of the target object (i.e. the detected location in the previous video frame) is represented by a template target window W (e.g. a rectangular window) that bounds the target object. The current image frame is divided into a number of windows W' based on the dimensions of the template window W. The tracking module then scans each window W' in the current image frame and compares the histograms to the histograms of the template window W. The scanned window W' most similar to the template target window W is designated as the target window W* for the current image frame. For example, in one embodiment, the tracking module selects a target image window W* that has a maximum similarity measure S with respect to the current template window W as given by Eq. (1) below:

$$W^* = \max_{W'} S(W', W) \qquad (1)$$

To determine the similarity measure S, the block configuration on the template window W is transferred 402 onto each scanned window W'. The K histograms $H_i^{W'}$ are then evaluated 404 in each of the transferred blocks. A similarity measure is then computed 406. In one embodiment, the similarity measure is defined as the weighted sum of the histogram intersections of $H_i^{W'}$ with $H_i^W$ as given in Eq. (2) below:

$$S(W', W) = \sum_{i=1}^{K} \lambda_i \rho(H_i^{W'}, H_i^W) \qquad (2)$$

where $\lambda_i$ is the corresponding weight of block $B_i$ and $\rho$ is the normalized histogram intersection based on Eq. (3) below [23]:

$$\rho(H_i^{W'}, H_i^W) = \frac{\sum_{b=1}^{N} \min(H_i^{W'}(b), H_i^W(b))}{\sum_{b=1}^{N} H_i^W(b)} \qquad (3)$$

where N is the number of bins in the histograms (e.g. N=16). Since the blocks are rectangular, these individual histograms can be computed by a few subtractions and additions using integral histograms. The computation in steps 402, 404, and 406 repeats 410 for each window W' in the current image frame. The window W' having the maximum similarity with the template window W is then selected 408 as the target window W* according to Eq. (1) above. The selected target window W* represents the detected location of the object in the current image frame.

Because the similarity measure S is based in part on the weights $\lambda_i$, the similarity measure S will give less weight to blocks containing more background pixels. This is desirable because it provides some measure against background noise and clutters. Note that comparing with most histogram-based trackers which invariably use only one histogram intersection, the similarity measure S defined in Eq. (2) actually encodes some amount of shape and spatial information through the block configuration and the weights.

Refinement Stage

Once the detection process above determines a sub-window W* in which the target is located, the next step is to extract an approximate boundary contour of the target object. This step accounts for shape variation of the target object as the object moves.

Figure 5:
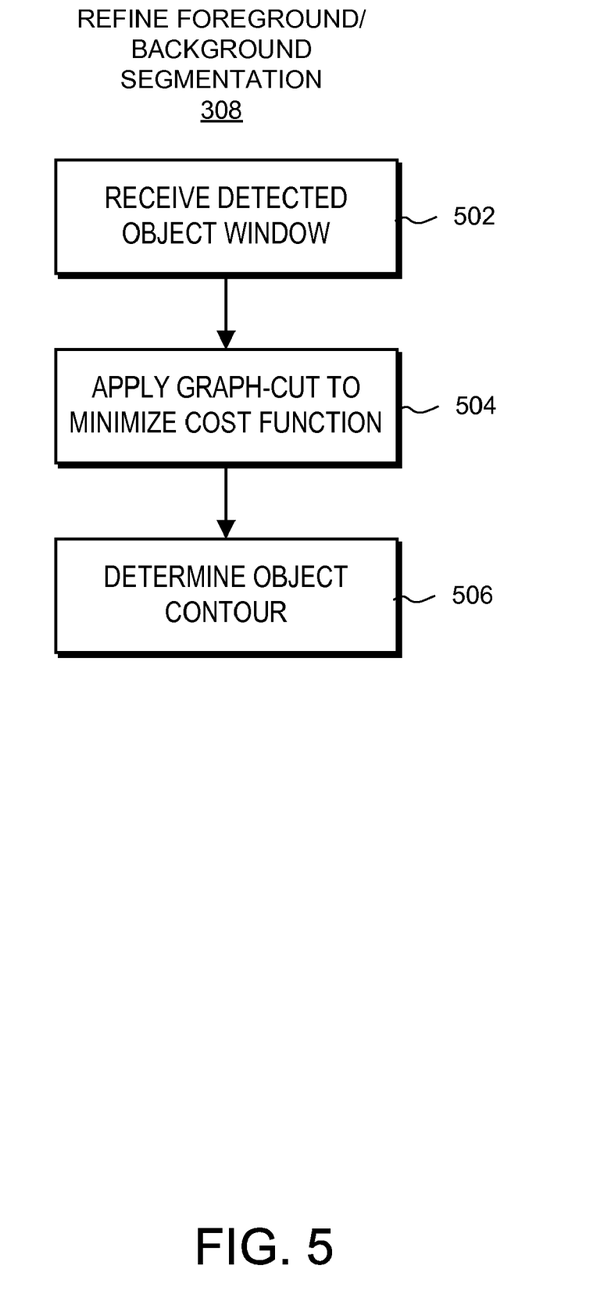
FIG. 5 is a flowchart illustrating a process for refining a foreground/background segmentation during visual tracking in accordance with an embodiment of the present invention.

An embodiment of the refining 308 the foreground/background segmentation is illustrated in FIG. 5. The refinement module 206 receives 502 the detected target window W* from the detection module 204. A graph-cut segmentation algorithm is then applied 504 to segment out the foreground target from the background pixels in the target window W*. One approach to this type of segmentation is to define the cost function in the form:

$$E = E_A + \mu E_S \quad (3)$$

where $E_A$ and $E_S$ are terms relating to appearance and shape respectively. However, it may be found that hard coding the shape prior using $E_S$ is more of a hindrance than help in the presence of extreme shape variation. Instead, one embodiment uses only the appearance term $E_A$. However, a shape component is still incorporated through the definition of foreground density as described below.

Specifically, let p denote an individual pixel and P denote the set of all pixels in W*. Let $P_B$ denote the estimated background density from the previous frame, and let $P_i$, (for $1 \leq i \leq K$) denote the foreground density for a block $B_i$ (computed by normalizing the histograms $H_i^{W*}$). Furthermore, $P_f$ denotes the initial foreground density obtained by normalizing the initial foreground histogram H. A graph-cut algorithm is applied that minimizes the cost function:

$$E(C_p) = \mu \sum_{p \in P} R_p(C_p) + \sum_{(p,q) \in N : C_p \neq C_q} B_{p,q} \quad (4)$$

where $C_p : P \to \{0, 1\}$ is a binary assignment function on P such that for a given pixel p, $C_p = 1$ if p is a foreground pixel and $C_p = 0$ otherwise, $\mu$ is a weighting factor, N denotes the set of neighboring pixels, and $B_{p,q}$ is defined as follows: [6, 12]

$$B_{p,q} \propto \frac{\exp((I(p) - I(q)^2)/2\sigma^2)}{\|p - q\|} \quad (5)$$

where I(p) is the intensity value at pixel p and $\sigma$ is a kernel width. The term $R_p(C_p)$ is given as $$R_p(C_p = 0) = -\log P_F(I(p),p)$$

$$R_p(C_p = 1) = -\log P_B(I(p)) \quad (6)$$

where $P_F(I(p),p) = P_i(I(p))$ if $p \in B_i$ and $P_F(I(p),p) = P_f(I(p))$ if p is not contained in any $B_i$. The shape information is implicitly encoded here through $P_F$. A fast combinatorial algorithm with polynomial complexity exists for minimizing the energy function E, based on the problem of computing a minimum cut across a graph. Additional details related to the graph-cut segmentation process may be found in Y. Boykov and M. P. Jolly "*Interactive Graph Cuts for Optimal Boundary and Region Segmentation of Objects in n-d Images.*" In Proc. Int. Conf. on Computer Vision, Volume 1, pages 105-112, 2001; and D. Freedman and T. Zhang, "*Active Contours For Tracking Distributions and Shape Prior.*" In Proc. Int. Conf. on Computer Vision, pages 755-762, 2005, the contents of which are incorporated by reference herein in their entirety.

Since the graph-cut is only performed in a (relatively) small window, this can be done very quickly and does not substantially increase the computational load. Based on the results of the graph-cut segmentation, an approximate object contour is determined 506 for the target object in the current image frame.

Update Stage

Figure 6:
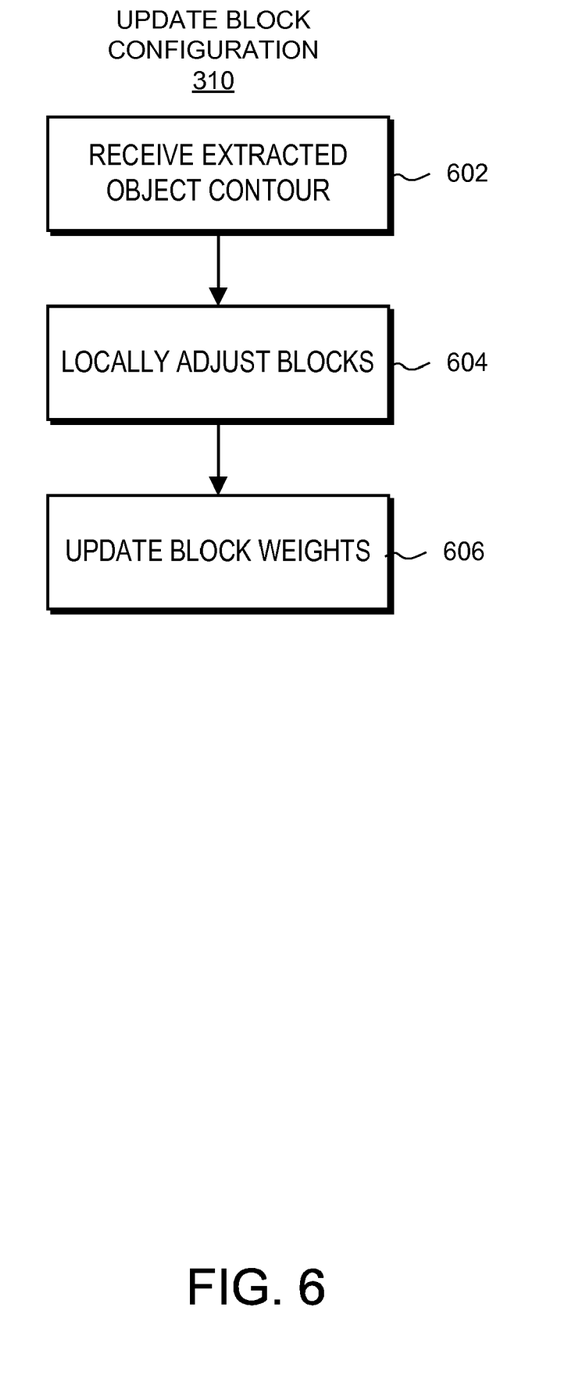
FIG. 6 illustrates examples of a process for updating a block configuration during visual tracking in accordance with an embodiment of the present invention.

After the object contour is extracted from the segmentation result, the positions of the blocks $B_i$ within W* are updated. An embodiment of a process for updating 310 the block configuration is illustrated in FIG. 6. The update module 208 receives 602 the extracted object contour from the refinement module 206. Based on the object contour, the blocks $B_i$ are locally adjusted 604 so that they provide the maximum coverage of the segmented foreground region. The blocks are repositioned in a controlled elastic manner to account for large articulate motion. Additionally the blocks may be resized. In one embodiment, the tracking module 204 employs a greedy strategy to cover the entire segmented foreground by moving each block locally using the priority based on their size. Because the foreground definition is known, the foreground histogram $H_i^W$ from each block $B_i$ can be computed. Furthermore the percentage $\eta_i$ of pixels $B_i$ that are foreground pixels can also be computed quickly. Finally, to maintain the stationary total foreground density, a small-scale non-negative least square problem is solved as given below:

$$H_f = \sum_{i=1}^{K} \alpha_i H_i^W \quad (7)$$

with $\alpha_i \geq 0$, and $H_f$ the foreground density of the last frame. The weights $\lambda_i$ are updated 606 according to $\lambda_i = \eta_i \alpha_i$ followed by normalization.

Overview

Advantageously, the run time complexity of the proposed tracking system and method is comparable to that of an integral histogram based tracker. However, the tracking module 106 of the present invention is able track articulate objects more accurately with negligible overhead in run time complexity. The tracking module 106 is efficient because it uses a simple but adequate shape representation that can be easily computed and managed. Furthermore, in contrast to tracking methods based on integral histograms, the tracking module 106 is also able to efficiently scan the entire images to detect the target object. The refinement and update steps are also efficient because segmentation is carried only locally in a (relatively) small window. Thus, the present invention provides accurate, stable, and efficient object tracking.

Reference in the specification to "one embodiment" or to "an embodiment" means that a particular feature, structure or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

The invention claimed is:

1. A method for tracking an object in a sequence of input images comprising:
   receiving a first image from the sequence of input images;
   detecting a first location of the object in the first image based on a set of weighted blocks representing a shape of the object;
   refining a segmentation of the object from a background image at the detected first location; and
   updating the set of weighted blocks representing the shape of the object based on the refined object segmentation.

2. The method of claim 1, further comprising:
   receiving a second image from the sequence of input images;
   detecting a second location of the object in the second image based on the updated set of weighted blocks representing the shape of the object.

3. The method of claim 1, wherein detecting the first location of the object in the first image comprises:
   transferring a prior block configuration from a template window of a previous image onto a scanning window of the first image;
   determining a histogram for each block of the transferred block configuration in the scanning window of the first image;
   computing a similarity measure between the scanning window and the template window based on the histograms; and
   determining the first location of the object based on the computed similarity measure.

4. The method of claim 3, wherein the similarity measure weights the histograms based on weights associated with each block in the block configuration.

5. The method of claim 4, wherein the weights associated with a first block in the block configuration are based at least in part on a foreground histogram for the first block.

6. The method of claim 1, wherein refining the segmentation of the object at the detected first location comprises:
   receiving a target window representing the detected first location of the object;
   applying a foreground/background segmentation within the target window; and
   determining a contour of the object based on the segmentation.

7. The method of claim 1, wherein updating the set of weighted blocks comprises:
   receiving a contour of the object based on the refined segmentation;
   adjusting a location of the weighted blocks based on the contour; and
   adjusting weights associated with the weighted blocks based on foreground and background histograms for the weighted blocks.

8. A non-transitory computer readable storage medium storing computer executable code for tracking an object in a sequence of input images, the computer executable code when executed performing the steps of:

receiving a first image from the sequence of input images;

detecting a first location of the object in the first image based on a set of weighted blocks representing a shape of the object;

refining a segmentation of the object from a background image at the detected first location; and updating the set of weighted blocks representing the shape of the object based on the refined object segmentation.

9. The non-transitory computer readable storage medium of claim 8, the computer executable code when executed further performing the steps of:

receiving a second image from the sequence of input images;

detecting a second location of the object in the second image based on the updated set of weighted blocks representing the shape of the object.

10. The non-transitory computer readable storage medium of claim 8, wherein detecting the first location of the object in the first image comprises:

transferring a prior block configuration from a template window of a previous image onto a scanning window of the first image;

determining a histogram for each block of the transferred block configuration in the scanning window of the first image;

computing a similarity measure between the scanning window and the template window based on the histograms; and determining the first location of the object based on the computed similarity measure.

11. The non-transitory computer readable storage medium of claim 10, wherein the histograms the similarity measure weights the histograms based on weights associated with each block in the block configuration.

12. The non-transitory computer readable storage medium of claim 11, wherein the weights associated with a first block in the block configuration are based at least in part on a foreground histogram for the first block.

13. The non-transitory computer readable storage medium of claim 8, wherein refining the segmentation of the object at the detected first location comprises:

receiving a target window representing the detected first location of the object;

applying a foreground/background segmentation within the target window; and determining a contour of the object based on the segmentation.

14. The non-transitory computer readable storage medium of claim 8, wherein updating the set of weighted blocks comprises:

receiving a contour of the object based on the refined segmentation;

adjusting a location of the weighted blocks based on the contour; and adjusting weights associated with the weighted blocks based on foreground and background histograms for the weighted blocks.

15. A system for tracking an object in a sequence of input images, comprising:

an input controller receiving a first image from the sequence of input images;

a detection module detecting a first location of the object in the first image based on a set of weighted blocks representing a shape of the object;

a refinement module refining a segmentation of the object from a background image at the detected first location;

an update module updating the set of weighted blocks representing the shape of the object based on the refined object segmentation; and an output controller outputting the detected first location.

16. The system of claim 15, wherein the input controller further receives a second image from the sequence of input images, and wherein the detection module further detects a second location of the object in the second image based on the updated set of weighted blocks representing the shape of the object.

17. The system of claim 15, wherein the detection module determines the first location of the object based on a computed similarity measure between scanned windows in the current image frame and a template window in a prior image frame.

18. The system of claim 17, wherein the similarity measure weights the histograms based on weights associated with each block in the block configuration.

19. The system of claim 18, wherein the weights associated with a first block in the block configuration are based at least in part on a foreground histogram for the first block.

20. The system of claim 15, wherein the refinement module applies a foreground/background segmentation within the target window, and determines a contour of the object based on the segmentation.

21. The system of claim 15, wherein the update module adjusts a location of the weighted blocks based on the contour, and adjusts weights associated with the weighted blocks based on foreground and background histograms for the blocks.

\* \* \* \* \*